(12) United States Patent  
Qu et al.

(10) Patent No.: US 11,551,465 B2  
(45) Date of Patent: Jan. 10, 2023

(54) METHOD AND APPARATUS FOR DETECTING FINGER OCCLUSION IMAGE, AND STORAGE MEDIUM

(71) Applicant: BEIJING XIAOMI PINECONE ELECTRONICS CO., LTD., Beijing (CN)

(72) Inventors: Zhi Qu, Beijing (CN); Yasen Zhang, Beijing (CN); Yan Song, Beijing (CN); Zhipeng Ge, Beijing (CN); Ruoyu Liu, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 184 days.

(21) Appl. No.: 17/217,825

(22) Filed: Mar. 30, 2021

(65) Prior Publication Data

US 2021/0406532 A1 Dec. 30, 2021

(30) Foreign Application Priority Data

Jun. 30, 2020 (CN) .......................... 202010614796.5

(51) Int. Cl.
*G06V 40/10* (2022.01)
*G06T 7/73* (2017.01)
(Continued)

(52) U.S. Cl.
CPC ............... *G06V 40/11* (2022.01); *G06T 7/11* (2017.01); *G06T 7/174* (2017.01); *G06T 7/74* (2017.01);
(Continued)

(58) Field of Classification Search
CPC ............. G06N 3/08; G06T 7/11; G06T 7/174; G06T 7/74; G06T 11/60; G06T 2207/20081;
(Continued)

(56) References Cited

U.S. PATENT DOCUMENTS 8,026,974 B2 * 9/2011 Ishijima ............. H04N 5/23218  
                                              348/346  
8,488,041 B2 * 7/2013 Nakajima ............. H04N 5/2171  
                                             348/42

(Continued)

FOREIGN PATENT DOCUMENTS

CN      107509059 A     12/2017  
CN      109241977 A     1/2019  
EP       2816797 A1     12/2014

OTHER PUBLICATIONS

Extended European Search Report in the European Application No. 21165488.4, dated Sep. 15, 2021, (8p).

(Continued)

*Primary Examiner* — Katrina R Fujita  
(74) *Attorney, Agent, or Firm* — Arch & Lake LLP

(57) ABSTRACT

A method for detecting a finger occlusion image includes: N first original occlusion images and M first non-occlusion images are acquired, and first training data set is generated based on first original occlusion images and first non-occlusion images; first training is performed, based on first training data set, on neural network model for detection of finger occlusion image; L second original occlusion images and K second non-occlusion images are acquired, and second training data set is generated based on second original occlusion images and second non-occlusion images; linear classifier in neural network model having completed first training is replaced with iterative training module to form finger occlusion image detection model; second training is performed on finger occlusion image detection model based on second training data set; image to be detected is input into trained finger occlusion image detection model, to determine whether image to be detected is finger occlusion image.

18 Claims, 6 Drawing Sheets

(51) Int. Cl.
  *G06T 7/11* (2017.01)
  *G06T 7/174* (2017.01)
  *G06T 11/60* (2006.01)
  *H04N 5/232* (2006.01)

(52) U.S. Cl.
  CPC ......... *G06T 11/60* (2013.01); *H04N 5/23222* (2013.01); *G06T 2207/20081* (2013.01); *G06T 2207/20084* (2013.01); *G06T 2207/30196* (2013.01)

(58) Field of Classification Search
  CPC ........... G06T 2207/20084; G06T 2207/30196; G06V 10/26; G06V 10/774; G06V 40/11; H04N 5/23222
  See application file for complete search history.

(56) References Cited

U.S. PATENT DOCUMENTS

| | | | | |
|---|---|---|---|---|
| 8,553,134 | B2* | 10/2013 | Shimizu | H04N 5/232123 348/649 |
| 9,025,072 | B2* | 5/2015 | Park | H04N 5/232127 348/222.1 |
| 9,055,210 | B2* | 6/2015 | Bos | H04N 5/23222 |
| 10,284,773 | B2* | 5/2019 | Pan | H04N 5/2351 |
| 10,303,866 | B1* | 5/2019 | Van Os | G06V 40/67 |
| 10,547,801 | B2* | 1/2020 | Cheaz | G06T 7/0002 |
| 2004/0012682 | A1 | 1/2004 | Kosaka et al. | |
| 2014/0133755 | A1 | 5/2014 | McCloskey | |
| 2015/0288874 | A1* | 10/2015 | Sivan | H04N 5/23258 348/207.11 |
| 2017/0358059 | A1* | 12/2017 | Zhang | G06T 7/194 |
| 2020/0104567 | A1* | 4/2020 | Tajbakhsh | G06V 40/165 |
| 2021/0407047 | A1* | 12/2021 | Goel | G06V 10/758 |

OTHER PUBLICATIONS

Jung Jaehoon et al: "Object Occlusion Detection Using Automatic Camera Calibration for a Wide-Area Video Surveillance System",Sensors,vol. 16, No. 7, Jan. 1, 2016 (Jan. 1, 2016 ), p. 982, XP055837706,DOI: 10.3390/s16070982Retrieved from the Internet:URL:https://www.ncbi.nlm.nih.gov/pmc/articles/PMC4970033 pdf/sensors-16-00 982.pdf. (11 p).

Maintenance of the lion"Decrypt the technology behind huawei P20 Pro threelens" Jun. 11, 2018.http://www.sohu.com/a/235065618_473190, (12p).

Andrew Williams "How the Huawei P20 Pro triple camera works"Mar. 28, 2018.https://www.techradar.com/news/how-the-huawei-p20-pro-triple-camera-works, (8p).

* cited by examiner

METHOD AND APPARATUS FOR DETECTING FINGER OCCLUSION IMAGE, AND STORAGE MEDIUM

CROSS-REFERENCE TO RELATED APPLICATIONS

This application is based upon and claims priority to Chinese Patent Application No. 2020106147965, filed on Jun. 30, 2020, the disclosure of which are hereby incorporated by reference in its entirety for all purposes.

TECHNICAL FIELD

The present disclosure generally relates to the field of camera control, and more particularly, to a method and apparatus for detecting a finger occlusion image that is an image with occlusion by fingers, and medium.

BACKGROUND

When a user takes a photo by a mobile phone in a lateral direction, the edge of the lens is easily occluded by fingers due to a photographing habit and the like, so that the edge of the photo has a small occlusion area. Since this type of occlusion is not easily noticed instantly, the user usually does not re-take the photo, thus he/she may regret for not having taken a perfect photo. The task of finger occlusion detection is to immediately determine whether an image is occluded or not after the image is taken, and to prompt, in real time, the user to take an image again after the occlusion image is detected.

Currently, finger occlusion detection may be performed by the following methods.

(1) A first method determines lens occlusion based on depth information. The method has the following characteristics: depth information of a background region needs to be known in advance; a depth sensor is provided to periodically acquire foreground information; conventional features such as histogram features, differential features and the like are used for determination. Therefore, the method first extracts the depth information using the depth sensor, establishes the foreground/background depth features, and then determines whether there is occlusion or not by establishing a foreground-background difference model. The method has the following disadvantages: low-end depth sensors may cause large depth data noise and introduces many uncertainties; high-end depth sensors may result in increased costs; in addition, due to some limitations in the effect, conventional features have been gradually in a position of assistance.

(2) A second method determines lens occlusion by using brightness information of a camera. The method uses the information of a brightness sensor to determine whether there is lens occlusion from the perspective of imaging brightness of the lens. This method has the following disadvantages: the recall rate is very low and an alarm is given only when the occlusion range is very large (the alarm is given only when the occlusion area is more than about ⅕ of the photo area); a false alarm may occur when the boundary compensation light is insufficient, for example, a frequent alarm may occur in a specific scene where there is a significant light-dark difference.

SUMMARY

To overcome the problems in the related art, the present disclosure provides a method and apparatus for detecting a finger occlusion image that is an image with occlusion by fingers, and a medium system.

According to a first aspect of the present disclosure, there is provided a method for detecting a finger occlusion image, including: N first original occlusion images and M first non-occlusion images are acquired, where N and M are positive integers and N<M, and a first training data set is generated based on the first original occlusion images and the first non-occlusion images; first training is performed, based on the first training data set, on a neural network model for detection of the finger occlusion image; L second original occlusion images and K second non-occlusion images are acquired, where L and K are positive integers and L<K, and a second training data set is generated based on the second original occlusion images and the second non-occlusion images, where a number of types of image scenes included in the K second non-occlusion images is less than a number of types of image scenes included in the M first non-occlusion images, and the K second non-occlusion images include error-prone scenes; a linear classifier in the neural network model that has completed the first training is replaced with an iterative training module to form a finger occlusion image detection model, the iterative training module being trained based on image scene features and image occlusion features included in the second training data set; second training is performed on the finger occlusion image detection model based on the second training data set; an image to be detected is input into the finger occlusion image detection model that has been trained, to determine whether the image to be detected is the finger occlusion image.

According to a second aspect of the present disclosure, there is provided a finger occlusion image detection method, including: a processor; and a memory for storing instructions executable by the processor; the processor is configured to: acquire N first original occlusion images and M first non-occlusion images, where N and M are positive integers and N<M, and generate a first training data set based on the first original occlusion images and the first non-occlusion images; perform, based on the first training data set, first training on a neural network model for detection of the finger occlusion image; acquire L second original occlusion images and K second non-occlusion images, where L and K are positive integers and L<K, and generate a second training data set based on the second original occlusion images and the second non-occlusion images, where a number of types of image scenes included in the K second non-occlusion images is less than a number of types of image scenes included in the M first non-occlusion images, and the K second non-occlusion images include error-prone scenes; replace a linear classifier in the neural network model that has completed the first training with an iterative training module to form a finger occlusion image detection model, the iterative training module being trained based on the image scene features and image occlusion features included in the second training data set; perform second training on the finger occlusion image detection model based on the second training data set; and determine inputting an image to be detected into the finger occlusion image detection model that has been trained, to determine whether the image to be detected is the finger occlusion image.

According to a third aspect of the present disclosure, there is provided A non-transitory computer-readable storage medium having stored therein instructions that, when executed by a processor of a router, causes the router to perform a method for detecting a finger occlusion image, the method including: N first original occlusion images and M first non-occlusion images are acquired, where N and M are positive integers and N<M, and a first training data set is generated based on the first original occlusion images and the first non-occlusion images; first training is performed on a neural network model for detection of the finger occlusion image based on the first training data set; L second original occlusion images and K second non-occlusion images are acquired, where L and K are positive integers and L<K, and a second training data set is generated based on the second original occlusion images and the second non-occlusion images, where a number of types of image scenes included in the K second non-occlusion images is less than a number of types of image scenes included in the M first non-occlusion images, and the K second non-occlusion images include error-prone scenes; a linear classifier in the neural network model that has completed the first training is replaced with an iterative training module to form a finger occlusion image detection model, the iterative training module being trained based on image scene features and image occlusion features included in the second training data set; second training is performed on the finger occlusion image detection model based on the second training data set; an image to be detected is input into the finger occlusion image detection model that has been trained, to determine whether the image to be detected is the finger occlusion image.

It is to be understood that both the foregoing general description and the following detailed description are exemplary and explanatory only and cannot limit the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
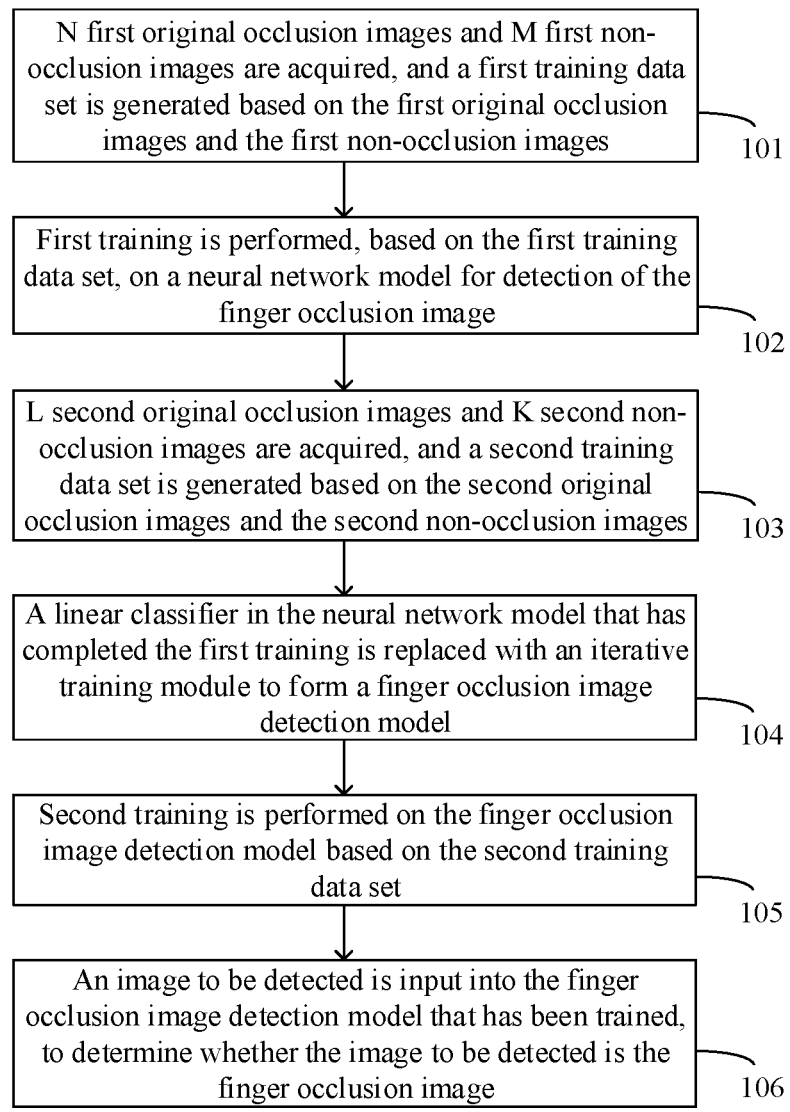
FIG. 1 is a flow chart of a method for detecting a finger occlusion image according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Terms used in the present disclosure are only adopted for the purpose of describing specific examples and are not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It is to be understood that, although terms first, second, third and the like may be used to describe various information in the present disclosure, the information should not be limited to these terms. These terms are only used to distinguish the information of the same type. For example, without departing from the scope of the present disclosure, first information may also be referred to as second information and, and similarly, second information may also be referred to as first information. For example, term "if" used here may be explained as "while" or "when" or "responsive to determining", which depends on the context.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

When a user takes a photo by a mobile phone in a lateral direction, the edge of the lens is easily occluded by fingers, so that the edge of the photo has a small occlusion area. Since this type of occlusion is not easily noticed instantly, the user usually does not re-take the photo, thus he/she may regret for not having taken a perfect photo. The task of finger occlusion detection is to immediately determine whether an image is occluded or not after the image is taken, and to prompt, in real time, the user to take an image again after the occlusion image is detected.

The current solutions have some shortcomings, for example, low-end depth sensors may cause large depth data noise, and high-end depth sensors may result in increased costs; the conventional features have been gradually in a position of assistance; the recall rate is very low and an alarm is given only when the occlusion range is very large; and a false alarm may occur when the boundary compensation light is insufficient.

The disclosure provides a method for detecting a finger occlusion image. In the method, two-step training is performed on a finger occlusion image detection model. A first-stage training is performed on a neural network model for finger occlusion image detection based on a first training data set; upon completion of the first-stage training, a linear classifier in the neural network model that has been trained is replaced with an iterative training module to form the finger occlusion image detection model, and then a second-stage training is performed on the finger occlusion image detection model based on a second training data set. Upon completion of the second-stage training, the finger occlusion image detection model may be used to determine whether the image to be detected is a finger occlusion image.

The method of the present disclosure is applicable to electronic products configured with cameras, such as cell phones, PADs, wearable devices, and the like.

The disclosure provides a method for detecting a finger occlusion image. FIG. 1 is a flow chart of a method for detecting a finger occlusion image, including the following operations.

In operation 101, N first original occlusion images and M first non-occlusion images are acquired, where N and M are positive integers and N<M, and a first training data set is generated based on the first original occlusion images and the first non-occlusion images.

In operation 102, first training is performed, based on the first training data set, on a neural network model for detection of the finger occlusion image.

In operation 103, L second original occlusion images and K second non-occlusion images are acquired, where L and K are positive integers and L<K, and a second training data set is generated based on the second original occlusion images and the second non-occlusion images, where a number of types of image scenes included in the K second non-occlusion images is less than a number of types of image scenes included in the M first non-occlusion images, and the K second non-occlusion images include error-prone scenes.

In operation 104, a linear classifier in the neural network model that has completed the first training is replaced with an iterative training module to form a finger occlusion image detection model, the iterative training module being trained based on image scene features and image occlusion features included in the second training data set so as to implement model training.

In operation 105, second training is performed on the finger occlusion image detection model based on the second training data set.

In operation 106, an image to be detected is input into the finger occlusion image detection model that has been trained, to determine whether the image to be detected is the finger occlusion image.

In this method, the training of the finger occlusion image detection model includes two stages. In the first-stage training, the first non-occlusion image and the partial image of the occlusion position are used to perform Poisson editing by means of data fusion to synthesize images of different occlusion situations of each scene, and a finger occlusion image detection model is trained by using the synthesized occlusion images and the original non-occlusion images. However, since the occlusion images are generated without taking into consideration the influence of illumination in the scene, the synthesized occlusion image is not exactly the same as an actual occlusion image. Therefore, this step is to implement the rough training of the all-scene classification boundary to ensure the preliminary compatibility of the model with all scenes. In the second-stage training, a linear classifier in the original neural network model for the finger occlusion image detection model is replaced with an iterative training module, and the iterative training module is trained alternately by the image scene features extracted from the multi-scene non-occlusion images and image occlusion features extracted from practically acquired occlusion images of a limited number of scenes. The second-stage training is to solve the problem of uncontrollable false alarms reported by the model models due to ambiguous and missing scenes. This is because, when finger occlusion is detected, the difference between the generated data and the actual situation causes the model to be unstable in some error-prone scenes, and score values fluctuate greatly; in addition, the acquired real finger occlusion data does not cover all error-prone scenes (such as beaches, sky with burning clouds and the like) in consideration of costs.

By training the finger occlusion image detection model by using the above two-stage training of the present disclosure, the risk of false alarm can be greatly reduced, and the false alarm rate can be reduced to 0.004%.

In this method, the original image data used to perform the first-stage training is different from that used in the second-stage training. This is because, through a large number of experiments, it has been found that the all-scene non-occlusion images used in the first-stage training need to reach a number of tens of millions, and the images include almost all types of scenes. However, the multi-scene non-occlusion images used in the second-stage training are several hundred thousand and only some types of scenes need to be included in the images, moreover, when too many types of scenes are included in the images, the detection effect is not good. Therefore, in order to ensure that the number of types of scenes in the multi-scene non-occlusion images used in the second-stage training is less than the number of types of scenes in the all-scene non-occlusion images used in the first-stage training, different image sets are used for the first-stage training and the second-stage training. Furthermore, the non-occlusion images used in the second-stage training include the error-prone scenes described above, that is, the types of scenes such as beach or sky with burning clouds, which are particularly easy to be mistaken in finger occlusion detection.

In addition, a number of occlusion images is much smaller than a number of non-occlusion images used in each of the first-stage training and the second-stage training. For example, the number of real occlusion images used in the first-stage training is between ten thousand and twenty thousand, and the number of real occlusion images used in the second-stage training is about tens of thousands. Because the acquisition cost of the real occlusion image is relatively high, the cost of training the model is greatly reduced. In addition, the labor cost required to manually label the occlusion position in the first-stage training is greatly reduced.

It should be noted that in the first-stage training, a neural network for performing the detection of the finger occlusion image is trained; in the second-stage training, the neural network is structurally adjusted, that is the linear classifier, which is the last layer in the neural network, is replaced with an iterative training module and then the adjusted neural network is trained. The iterative training module is trained based on the image scene features and the image occlusion features included in the second training data set, so as to implement model training. A schematic diagram of an iterative training module is shown in FIG. 2.

The loss function used in the first-stage training comprehensively considers the classification task, the feature measurement task, and the segmentation task. And the loss function may be implemented by a person skilled in the art according to an existing design, and details are not described herein.

Figure 2:
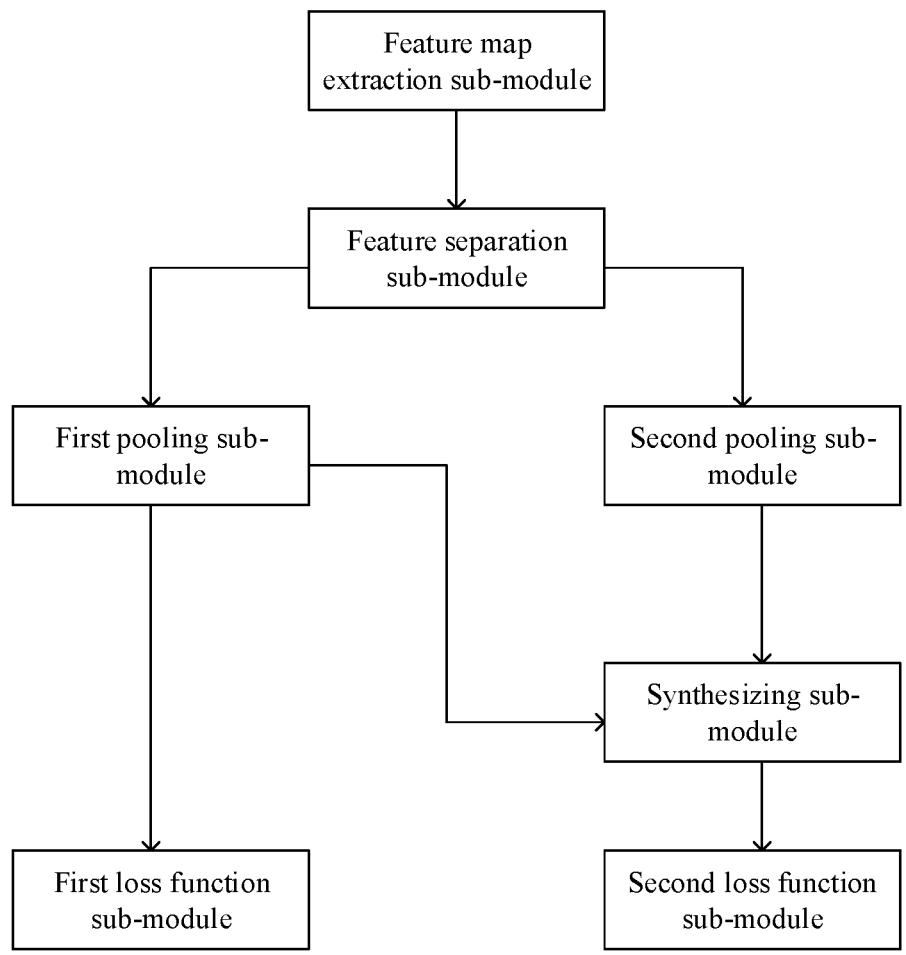
FIG. 2 is a schematic diagram of an iterative training module according to an exemplary embodiment.

As can be seen from FIG. 2, the iterative training module includes a feature map extraction sub-module for extracting a feature map of an image from a second training data set; a feature separation module for separating image scene features from image occlusion features in the feature map; a first pooling sub-module for averaging a plurality of pixel features based on the image scene features; a second pooling sub-module for averaging the plurality of pixel features based on the image occlusion features; a synthesizing sub-module for synthesizing the pooled image scene features and the pooled image occlusion features; a first loss function sub-module for obtaining a loss function that is based on image scene features; a second loss function sub-module for obtaining a loss function that is based on the synthesized feature.

When the finger occlusion image detection model to which the iterative training module is added is trained, the image scene features and the image occlusion features are respectively used for alternating training, and when the two loss functions obtained by the first loss function sub-module and the second loss function sub-module converge, the training is completed.

In an alternative embodiment, the generating a first training data set based on the first original occlusion image and the first non-occlusion image may include:

a synthesized occlusion image is generated based on the first original occlusion images and the first non-occlusion images by occluding each of the first non-occlusion images, to obtain M synthesized occlusion images; and the first training data set is generated based on the M first non-occlusion images and the M synthesized occlusion images.

Herein, by means of the above-described image synthesizing, M synthesized occlusion images are generated by M first non-occlusion images. For example, by more than 10,000 but less than 20,000 original occlusion images, tens of millions of synthesized occlusion images are acquired, it is thus possible to greatly increase the number of occlusion images available for training, and reduce the cost of acquiring the original occlusion images.

In an alternative embodiment, the operation that the synthesized occlusion image is generated, based on the first original occlusion images and the first non-occlusion images, by occluding each of the first non-occlusion images may include:

a first original occlusion image is selected from the N first original occlusion images for each of the first non-occlusion images;

a partial image of an occlusion position of the selected first original finger occlusion image is acquired based on the selected first original finger occlusion image; and the synthesized occlusion image is generated based on the first non-occlusion image and the partial image of the occlusion position.

When each non-occlusion image is used to synthesize an occlusion image, an original occlusion image is randomly selected, and a partial image of an occlusion position of the selected original occlusion image is acquired. A method for acquiring a partial image of an occlusion position will be described in detail below.

In an alternative embodiment, the operation that the partial image of the occlusion position of the selected first original finger occlusion image is acquired based on the selected first original finger occlusion image may include:

mask data is acquired based on the selected first original finger occlusion image, the mask data indicating a position of a finger in the selected first original finger occlusion image; and the partial image of the occlusion position is acquired through an integral image algorithm based on the selected first original finger occlusion image and the mask data.

For each original finger occlusion image, its mask data is manually labeled. The mask data includes: full occlusion area data, semi-occlusion area data, and non-occlusion area data. The RGB data of the full occlusion area is set to, for example, (0, 0, 0), the RGB data of the non-occlusion area data is set to, for example, (255, 255, 255), and the RGB data of the semi-occlusion area is set to, for example, (255, 0, 0) (i.e., exhibiting a red color).

The partial image of the occlusion position is acquired through an integral image algorithm based on the first original finger occlusion image and the the partial image of the occlusion position. Specifically, an integral value image of the mask image (obtained from the mask data) in the X-axis direction and the Y-axis direction is used to determine the size of the occlusion area that needs to be intercepted, and then the corresponding occlusion position is cut.

In an alternative embodiment, the operation that the synthesized occlusion image is generated based on the first non-occlusion image and the partial image of the occlusion position may include:

the synthesized occlusion image is generated by performing Poisson editing on the first non-occlusion image and the partial image of the occlusion position.

Herein, the first non-occlusion image and the partial image of the occlusion position are synthesized into an occlusion image in the first non-occlusion image scene. In order to make the synthesized image more natural and have no obvious synthesis boundary, the above two images are synthesized by a Poisson editing, so that seamless fusion is realized at the boundary of the two images. That is, the synthesized occlusion image is made closer to the occlusion image actually captured.

In an alternative embodiment, the operation that the second training is performed on the finger occlusion image detection model based on the second training data set may include:

image scene feature data and image occlusion feature data are acquired based on the second training data set;

model training is performed based on the image scene feature data and the image occlusion feature data alternately;

a first loss function for the model training performed based on the image scene feature data is acquired, and a second loss function for the model training performed based on the image occlusion feature data is acquired; and in response to the first loss function and the second loss function being convergent, it is determined that the training of the finger occlusion image detection model completes.

In this embodiment, the effect of scene feature fusion is achieved by the iterative training module. It is found through experiments for model training that even if some scenes are added in the training, they do not improve the accuracy of samples of this type, and incremental features have to be added to help such samples to be classified into the correct categories. Therefore, the features included in the extracted feature map are divided into two parts: image scene features and image occlusion features; 80% of the feature data in the feature map is extracted as the image scene feature data, and 20% of the feature data in the feature map is extracted as the image occlusion feature data.

With reference to the iterative training module shown in FIG. 2, the training based on image scene feature data and the training based on image occlusion feature data are performed separately and alternately when the model is trained. When the first loss function for the training based on the image scene feature data and the second loss function for the training based on the data in the image occlusion feature data converge, it is determined that the training of the finger occlusion image detection model completes.

In an alternative embodiment, the first loss function is obtained based on the image scene feature data, and the second loss function is obtained based on the image scene feature data and the image occlusion feature data.

As shown in FIG. 2, the first loss function is obtained by pooling the image scene feature data, and the second loss function is obtained by pooling the image scene feature data and the image occlusion feature data.

In an alternative embodiment, the operation that the model training is performed alternately based on the image scene feature data and the image occlusion feature data may include:

when the model training is performed based on the image scene feature data, statistical parameters that are based on the image occlusion feature data among parameters of the finger occlusion image detection model are kept unchanged.

In this embodiment, the statistical parameters that are based on the image occlusion feature data are kept unchanged, so that the feature has an explicit scene representation. That is, other parameters of the model are trained by using the image scene feature data, with the statistical parameters of the image occlusion feature data being kept unchanged.

In an alternative embodiment, a number of types of image scenes included in the M first non-occlusion images is greater than a number of types of image scenes included in the K second non-occlusion images.

Through a large number of experiments, it has been found that if the types of scenes included in multi-scene non-occlusion images used in the second-stage training are excessive, the detection effect is not good. Therefore, the number of types of scenes included in the non-occlusion images in the second-stage training is less than the number of types of scenes included in the non-occlusion image during the first-stage training.

Figure 3:
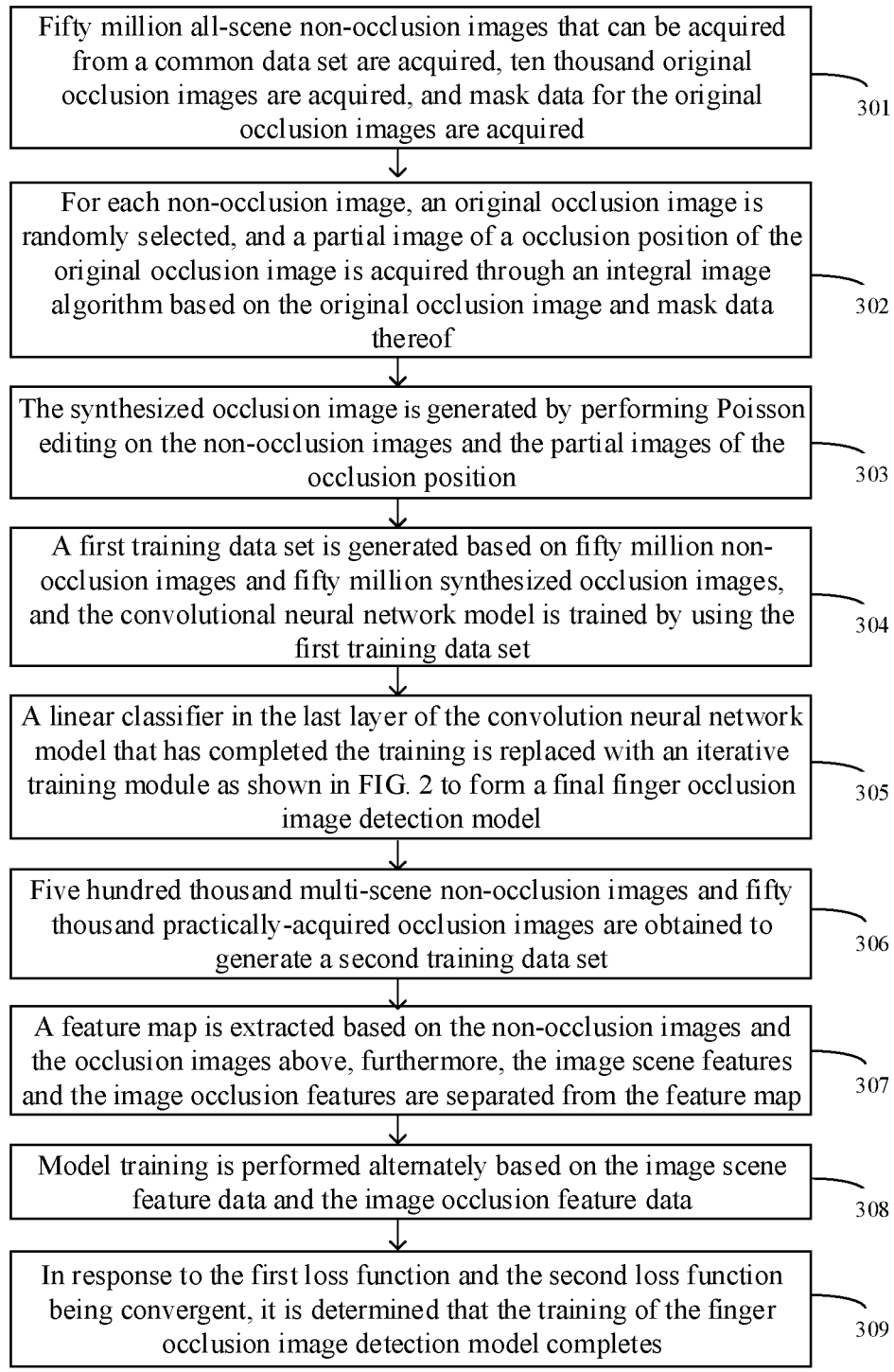
FIG. 3 is a flow chart of a method for detecting a finger occlusion image according to an exemplary embodiment.

A specific embodiment of the method for detecting a finger occlusion image according to the present disclosure is described in detail below. The model used in the first-stage training is a convolutional neural network model, and the linear classifier in the convolutional neural network model is replaced in the second-stage training. As shown in FIG. 3, the embodiment includes the following operations.

In operation 301, fifty million all-scene non-occlusion images that can be acquired from a common data set are acquired, ten thousand original occlusion images are acquired, and mask data for the original occlusion images are acquired.

In operation 302, for each non-occlusion image, an original occlusion image is randomly selected, and a partial image of a occlusion position of the original occlusion image is acquired through an integral image algorithm based on the original occlusion image and mask data thereof.

In operation 303, a synthesized occlusion image is generated by performing Poisson editing on the non-occlusion image and the partial image of the occlusion position.

In operation 304, a first training data set is generated based on fifty million non-occlusion images and fifty million synthesized occlusion images, and a convolutional neural network model is trained by using the first training data set.

In operation 305, a linear classifier in the last layer of the convolution neural network model that has completed the training is replaced with an iterative training module as shown in FIG. 2 to form a final finger occlusion image detection model.

In operation 306, five hundred thousand multi-scene non-occlusion images and fifty thousand practically-acquired occlusion images are obtained to generate a second training data set.

In operation 307, a feature map is extracted based on the non-occlusion images and the occlusion images above, and the image scene features and the image occlusion features are separated from the feature map.

In operation 308, model training is performed alternately based on the image scene feature data and the image occlusion feature data.

In operation 309, in response to the first loss function and the second loss function being convergent, it is determined that the training of the finger occlusion image detection model completes.

Figure 4:
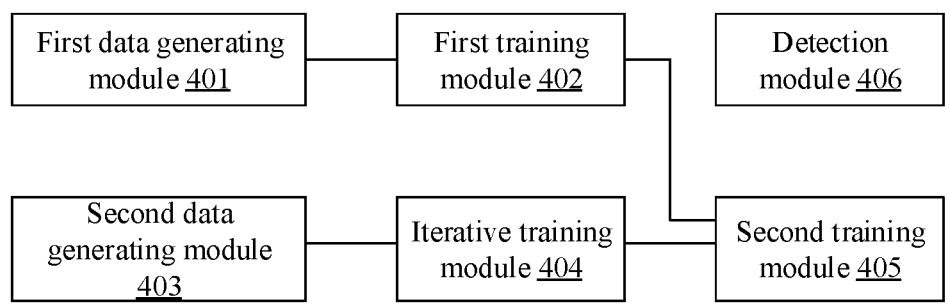
FIG. 4 is a block diagram of a device for detecting a finger occlusion image according to an exemplary embodiment.

The present disclosure also provides a device for detecting a finger occlusion image, as shown in FIG. 4, including:

a first data generating module 401, configured to acquire N first original occlusion images and M first non-occlusion images, where N and M are positive integers and N<M, and generate a first training data set based on the first original occlusion images and the first non-occlusion images;

a first training module 402, configured to perform, based on the first training data set, first training on a neural network model for detection of the finger occlusion image;

a second data generating module 403, configured to acquire L second original occlusion images and K second non-occlusion images, where L and K are positive integers and L<K, and generate a second training data set based on the second original occlusion images and the second non-occlusion images, where a number of types of image scenes included in the K second non-occlusion images is less than a number of types of image scenes included in the M first non-occlusion images, and the K second non-occlusion images include error-prone scenes;

an iterative training module 404, configured to replace a linear classifier in the neural network model that has completed the first training to form a finger occlusion image detection model, the iterative training module being trained based on the image scene features and image occlusion features included in the second training data set so as to implement model training;

a second training module 405, configured to perform second training on the finger occlusion image detection model based on the second training data set; and a detection module 406, configured to use the finger occlusion image detection model that has been trained, to determine whether the image to be detected is the finger occlusion image.

In an alternative embodiment, the first data generating module 401 is further configured to:

generate, based on the first original occlusion images and the first non-occlusion images, a synthesized occlusion image by occluding each of the first non-occlusion images to obtain M synthesized occlusion images; and generate the first training data set based on the M first non-occlusion images and the M synthesized occlusion images.

In an alternative embodiment, the first data generating module 401 is further configured to:

select a first original finger occlusion image from the N first original occlusion images for each of the first non-occlusion images;

acquire a partial image of an occlusion position of the selected first original finger occlusion image based on the selected first original finger occlusion image; and generate the synthesized occlusion image based on the first non-occlusion image and the partial image of the occlusion position.

In an alternative embodiment, the first data generating module 401 is further configured to:

acquire mask data based on the selected first original finger occlusion image, the mask data indicating the position of the finger in the selected first original finger occlusion image; and acquire the partial image of the occlusion position through an integral image algorithm based on the selected first original finger occlusion image and the mask data.

In an alternative embodiment, the first data generating module 401 is further configured to:

generate the synthesized occlusion image by performing Poisson editing on the first non-occlusion image and the partial image of the occlusion position.

In an alternative embodiment, the second training module 405 is further configured to:

acquire image scene feature data and image occlusion feature data based on the second training data set;

perform model training based on the image scene feature data and the image occlusion feature data alternately;

acquire a first loss function for the model training performed based on the image scene feature data and a second loss function for the model training performed based on the image occlusion feature data; and determine that the training of the finger occlusion image detection model completes in response to the first loss function and the second loss function being convergent.

In an alternative embodiment, the first loss function is obtained based on the image scene feature data, and the second loss function is obtained based on the image scene feature data and the image occlusion feature data.

In an alternative embodiment, the second training module 405 is further configured to:

when the model training is performed based on the image scene feature data, keep statistical parameters that are based on the image occlusion feature data among parameters of the finger occlusion image detection model unchanged.

In an alternative embodiment, a number of types of image scenes included in the M first non-occlusion images is greater than a number of types of image scenes included in the K second non-occlusion images.

With respect to the devices in the above embodiments, the specific manners for performing operations for individual modules therein have been described in detail in the embodiments regarding the methods, which will not be elaborated herein.

By training the finger occlusion image detection model by using the above two-stage training of the present disclosure, the risk of false alarm can be greatly reduced, and the false alarm rate can be reduced to 0.004%.

Figure 5:
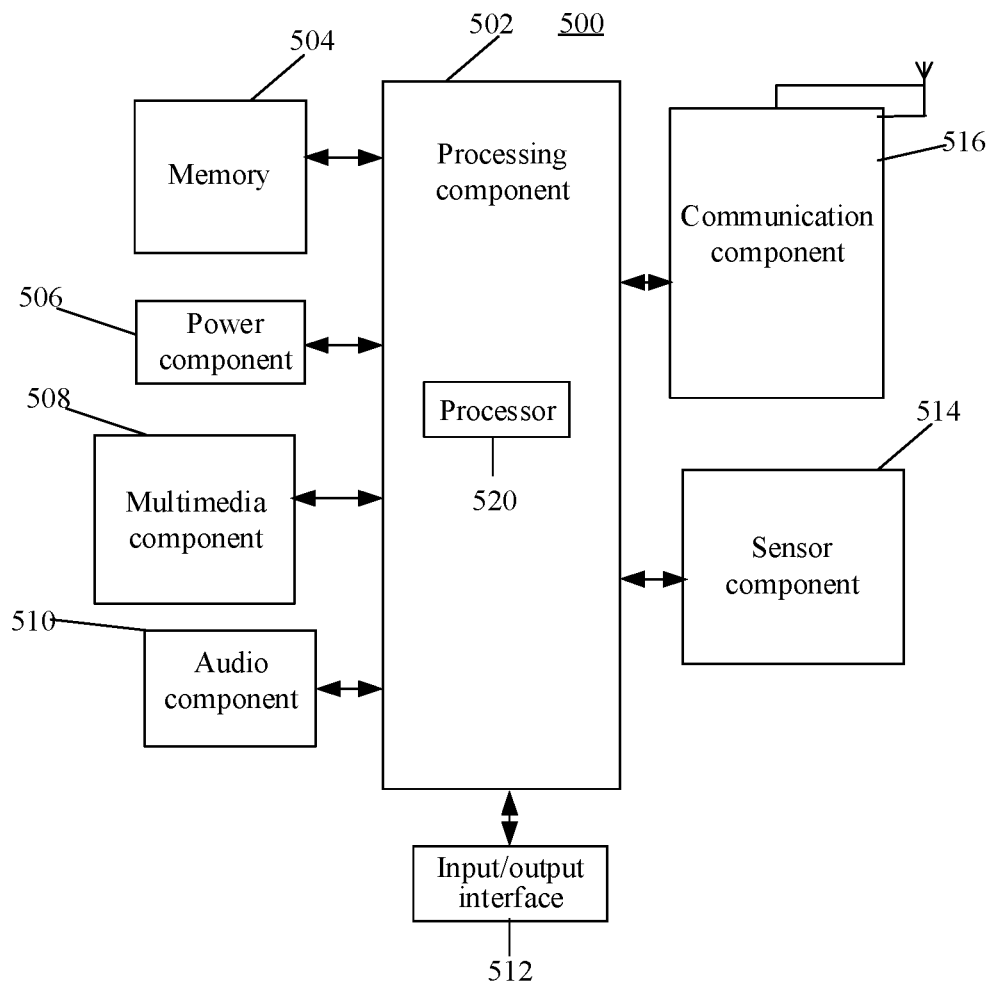
FIG. 5 is a block diagram of a device according to an exemplary embodiment.

FIG. 5 is a block diagram of a device 500 for detecting a finger occlusion image according to an exemplary embodiment. For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 802 may include one or more processors 520 to execute instructions to perform all or part of the steps in the above described methods. Moreover, the processing component 802 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like.

The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 504, executable by the processor 520 in the device 500, for performing the above-described methods. For example, the non-transitory computer-readable storage medium may be a ROM, a CD-ROM, a magnetic tape, a floppy disc, an optical data storage device, and the like.

There is provided a non-transitory computer-readable storage medium having stored therein instructions that, when executed by a processor of a router, causes the router to perform a method for detecting a finger occlusion image, the method including: N first original occlusion images and M first non-occlusion images are acquired, where N and M are positive integers and N<M, and a first training data set is generated based on the first original occlusion images and the first non-occlusion images; first training is performed, based on the first training data set, on a neural network model for detection of the finger occlusion image; L second original occlusion images and K second non-occlusion images are acquired, where L and K are positive integers and L<K, and a second training data set is generated based on the second original occlusion images and the second non-occlusion images, where a number of types of image scenes included in the K second non-occlusion images is less than a number of types of image scenes included in the M first non-occlusion images, and the K second non-occlusion images include error-prone scenes; a linear classifier in the neural network model that has completed the first training is replaced with an iterative training module to form a finger occlusion image detection model, the iterative training module being trained based on image scene features and image occlusion features included in the second training data set so as to implement model training; second training is performed on the finger occlusion image detection model based on the second training data set; an image to be detected is input into the finger occlusion image detection model that has been trained, to determine whether the image to be detected is the finger occlusion image.

Figure 6:
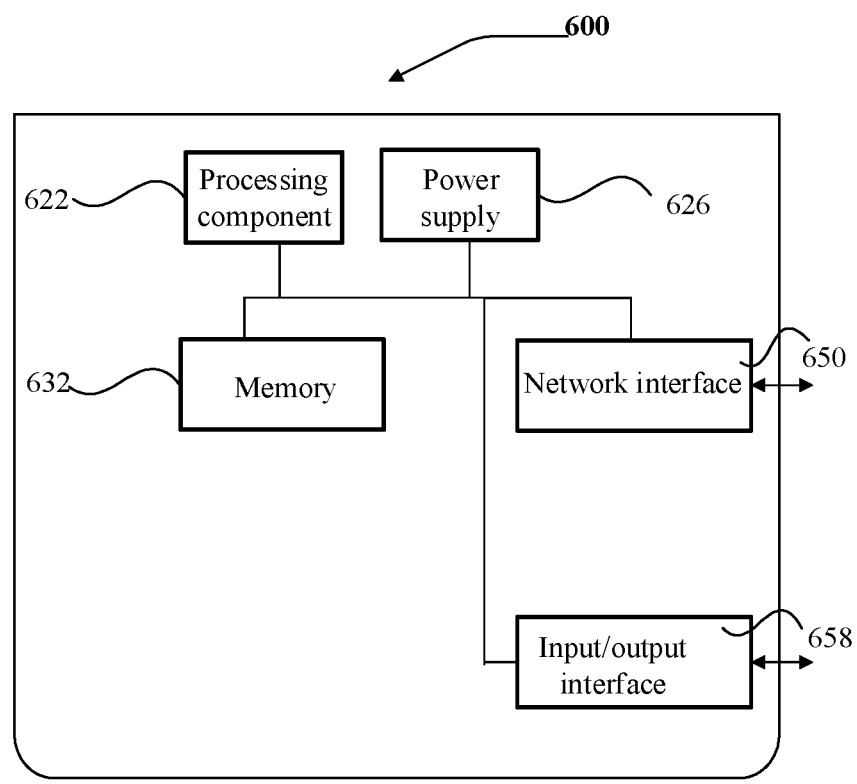
FIG. 6 is a block diagram of a device according to an exemplary embodiment.

FIG. 6 is a block diagram of a device 600 for detecting a finger occlusion image according to an exemplary embodiment. For example, the device 600 may be a server. The device 600 may vary widely in configuration or capabilities, but it may include a processing component 622, it further may include one or more processors, and the memory resources represented by the memory 632 are used to store instructions that can be executed by the processing component 622, such as application programs. The application program stored in the memory 632 may include one or more modules each corresponding to a set of instructions. In addition, the processing component 622 is configured to execute instructions to execute the above-mentioned method: N first original occlusion images and M first non-occlusion images are acquired, where N and M are positive integers and N<M, and a first training data set is generated based on the first original occlusion images and the first non-occlusion images; first training is performed, based on the first training data set, on a neural network model for detection of the finger occlusion image; L second original occlusion images and K second non-occlusion images are acquired, where L and K are positive integers and L<K, and a second training data set is generated based on the second original occlusion images and the second non-occlusion images, where a number of types of image scenes included in the K second non-occlusion images is less than a number of types of image scenes included in the M first non-occlusion images, and the K second non-occlusion images include error-prone scenes; a linear classifier in the neural network model that has completed the first training is replaced with an iterative training module to form a finger occlusion image detection model, the iterative training module being trained based on image scene features and image occlusion features included in the second training data set so as to implement model training; second training is performed on the finger occlusion image detection model based on the second training data set; an image to be detected is input into the finger occlusion image detection model that has been trained, to determine whether the image to be detected is the finger occlusion image.

The device 600 may also include a power supply 626 configured to perform power management of the device 600, a wired or wireless network interface 650 configured to connect the device 600 to a network, an input/output interface 658. The device 600 can operate based on an operating system stored in the memory 632, such as Windows Server™, Mac OS X™, Unix™, Linux™, FreeBSD™ or the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for detecting a finger occlusion image, comprising:
   acquiring N first original occlusion images and M first non-occlusion images, where N and M are positive integers and N<M, and generating a first training data set based on the first original occlusion images and the first non-occlusion images;
   performing, based on the first training data set, first training on a neural network model for detection of the finger occlusion image with occlusion by fingers;
   acquiring L second original occlusion images and K second non-occlusion images, where L and K are positive integers and L<K, and generating a second training data set based on the second original occlusion images and the second non-occlusion images, wherein a number of types of image scenes comprised in the K second non-occlusion images is less than a number of types of image scenes comprised in the M first non-occlusion images, and the K second non-occlusion images comprise error-prone scenes;
   replacing a linear classifier in the neural network model that has completed the first training with an iterative training module to form a finger occlusion image detection model, the iterative training module being trained based on image scene features and image occlusion features comprised in the second training data set;
   performing second training on the finger occlusion image detection model based on the second training data set; and
   inputting an image to be detected into the finger occlusion image detection model that has been trained, to determine whether the image to be detected is the finger occlusion image.

2. The method of claim 1, wherein generating the first training data set based on the first original occlusion images and the first non-occlusion images comprises:
   generating, based on the first original occlusion images and the first non-occlusion images, a synthesized occlusion image by occluding each of the first non-occlusion images, to obtain M synthesized occlusion images; and
   generating the first training data set based on the M first non-occlusion images and the M synthesized occlusion images.

3. The method of claim 2, wherein generating, based on the first original occlusion images and the first non-occlusion images, the synthesized occlusion image by occluding each of the first non-occlusion images comprises:
   selecting a first original finger occlusion image from the N first original occlusion images for each of the first non-occlusion images;
   acquiring a partial image of an occlusion position of the selected first original finger occlusion image based on the selected first original finger occlusion image; and
   generating the synthesized occlusion image based on the first non-occlusion image and the partial image of the occlusion position.

4. The method of claim 3, wherein acquiring the partial image of the occlusion position of the selected first original finger occlusion image based on the selected first original finger occlusion image comprises:
   acquiring mask data based on the selected first original finger occlusion image, the mask data indicating a position of a finger in the selected first original finger occlusion image; and
   acquiring the partial image of the occlusion position through an integral image algorithm based on the selected first original finger occlusion image and the mask data.

5. The method of claim 3, wherein generating the synthesized occlusion image based on the first non-occlusion image and the partial image of the occlusion position comprises:
   generating the synthesized occlusion image by performing Poisson editing on the first non-occlusion image and the partial image of the occlusion position.

6. The method of claim 1, wherein performing the second training on the finger occlusion image detection model based on the second training data set comprises:
   acquiring image scene feature data and image occlusion feature data based on the second training data set;
   performing model training based on the image scene feature data and the image occlusion feature data alternately;
   acquiring a first loss function for the model training performed based on the image scene feature data and a second loss function for the model training performed based on the image occlusion feature data; and
   determining that the training of the finger occlusion image detection model completes in response to the first loss function and the second loss function being convergent.

7. The method of claim 6, wherein the first loss function is obtained based on the image scene feature data, and the second loss function is obtained based on the image scene feature data and the image occlusion feature data.

8. The method of claim 6, wherein performing the model training based on the image scene feature data and the image occlusion feature data alternately comprises:
   when the model training is performed based on the image scene feature data, keeping statistical parameters that are based on the image occlusion feature data among parameters of the finger occlusion image detection model unchanged.

9. A device for detecting a finger occlusion image, comprising:
   a processor;
   a memory for storing instructions executable by the processor;
   wherein the processor is configured to:
   acquire N first original occlusion images and M first non-occlusion images, where N and M are positive integers and N<M, and generate a first training data set based on the first original occlusion images and the first non-occlusion images;
   perform, based on the first training data set, first training on a neural network model for detection of the finger occlusion image with occlusion by fingers;

acquire L second original occlusion images and K second non-occlusion images, where L and K are positive integers and L<K, and generate a second training data set based on the second original occlusion images and the second non-occlusion images, wherein a number of types of image scenes comprised in the K second non-occlusion images is less than a number of types of image scenes comprised in the M first non-occlusion images, and the K second non-occlusion images comprise error-prone scenes;

replace a linear classifier in the neural network model that has completed the first training to form a finger occlusion image detection model, the iterative training module being trained based on the image scene features and image occlusion features comprised in the second training data set;

perform second training on the finger occlusion image detection model based on the second training data set; and use the finger occlusion image detection model that has been trained, to determine whether the image to be detected is the finger occlusion image.

10. The device of claim 9, wherein to generate the first training data set based on the first original occlusion images and the first non-occlusion images, the processor is configured to:

generate, based on the first original occlusion images and the first non-occlusion images, a synthesized occlusion image by occluding each of the first non-occlusion images to obtain M synthesized occlusion images; and generate the first training data set based on the M first non-occlusion images and the M synthesized occlusion images.

11. The device of claim 10, wherein to generate, based on the first original occlusion images and the first non-occlusion images, the synthesized occlusion image by occluding each of the first non-occlusion images, the processor is configured to:

select a first original finger occlusion image from the N first original occlusion images for each of the first non-occlusion images;

acquire a partial image of an occlusion position of the selected first original finger occlusion image based on the selected first original finger occlusion image; and generate the synthesized occlusion image based on the first non-occlusion image and the partial image of the occlusion position.

12. The device of claim 11, wherein to acquire the partial image of the occlusion position of the selected first original finger occlusion image based on the selected first original finger occlusion image, the processor is configured to:

acquire mask data based on the selected first original finger occlusion image, the mask data indicating the position of the finger in the selected first original finger occlusion image; and acquire the partial image of the occlusion position through an integral image algorithm based on the selected first original finger occlusion image and the mask data.

13. The device of claim 11, wherein to generate the synthesized occlusion image based on the first non-occlusion image and the partial image of the occlusion position, the processor is configured to:

generate the synthesized occlusion image by performing Poisson editing on the first non-occlusion image and the partial image of the occlusion position.

14. The device of claim 9, wherein to perform the second training on the finger occlusion image detection model based on the second training data set, the processor is configured to:

acquire image scene feature data and image occlusion feature data based on the second training data set;

perform model training based on the image scene feature data and the image occlusion feature data alternately;

acquire a first loss function for the model training performed based on the image scene feature data and a second loss function for the model training performed based on the image occlusion feature data; and determine that the training of the finger occlusion image detection model completes in response to the first loss function and the second loss function being convergent.

15. The device of claim 14, wherein the first loss function is obtained based on the image scene feature data, and the second loss function is obtained based on the image scene feature data and the image occlusion feature data.

16. The device of claim 14, wherein to perform the model training based on the image scene feature data and the image occlusion feature data alternately, the processor is configured to:

when the model training is performed based on the image scene feature data, keep statistical parameters that are based on the image occlusion feature data among parameters of the finger occlusion image detection model unchanged.

17. A non-transitory computer-readable storage medium having stored therein instructions that, when executed by a processor of a router, causes the router to perform acts comprising:

acquiring N first original occlusion images and M first non-occlusion images, where N and M are positive integers and N<M, and generating a first training data set based on the first original occlusion images and the first non-occlusion images;

performing, based on the first training data set, first training on a neural network model for detection of a finger occlusion image with occlusion by fingers;

acquiring L second original occlusion images and K second non-occlusion images, where L and K are positive integers and L<K, and generating a second training data set based on the second original occlusion images and the second non-occlusion images, wherein a number of types of image scenes comprised in the K second non-occlusion images is less than a number of types of image scenes comprised in the M first non-occlusion images, and the K second non-occlusion images comprise error-prone scenes;

replacing a linear classifier in the neural network model that has completed the first training with an iterative training module to form a finger occlusion image detection model, the iterative training module being trained based on image scene features and image occlusion features comprised in the second training data set;

performing second training on the finger occlusion image detection model based on the second training data set; and inputting an image to be detected into the finger occlusion image detection model that has been trained, to determine whether the image to be detected is the finger occlusion image.

18. The non-transitory computer-readable storage medium of claim 17, wherein generating the first training data set based on the first original occlusion images and the first non-occlusion images comprises:

generating, based on the first original occlusion images and the first non-occlusion images, a synthesized occlusion image by occluding each of the first non-occlusion images, to obtain M synthesized occlusion images; and
generating the first training data set based on the M first non-occlusion images and the M synthesized occlusion images.

* * * * *